United States Patent
Nohara et al.

(10) Patent No.: US 7,035,311 B2
(45) Date of Patent: Apr. 25, 2006

(54) APPARATUS AND METHOD FOR A DIGITAL, WIDEBAND, INTERCEPT AND ANALYSIS PROCESSOR FOR FREQUENCY HOPPING SIGNALS

(75) Inventors: Tim J. Nohara, Fonthill (CA); Peter Weber, Dundas (CA); Al Premji, St. Catherines (CA); Graeme Jones, Waterloo (CA)

(73) Assignee: Sicom Systems, Ltd., Ontario (CA)

( * ) Notice: Subject to any disclaimer, the term of this patent is extended or adjusted under 35 U.S.C. 154(b) by 732 days.

(21) Appl. No.: 10/011,544

(22) Filed: Dec. 5, 2001

(65) Prior Publication Data

US 2003/0103589 A1    Jun. 5, 2003

(51) Int. Cl.
*H04L 27/30*    (2006.01)

(52) U.S. Cl. ............... 375/132; 375/256; 455/150.1; 455/154.2

(58) Field of Classification Search .......... 375/132, 375/133, 136, 138, 256, 316, 340; 455/150.1, 455/154.1, 154.2, 160.1, 161.1, 161.2

See application file for complete search history.

(56) References Cited

U.S. PATENT DOCUMENTS 5,412,690 A * 5/1995 Kotzin et al. ............... 375/256
6,570,910 B1 * 5/2003 Bottomley et al. ......... 375/148

* cited by examiner

*Primary Examiner*—Dac V. Ha
(74) *Attorney, Agent, or Firm*—R. Neil Sudol; Henry D. Coleman; William J. Sapone

(57) ABSTRACT

A signal intercept and analysis processor for a wideband intercept receiver system including at least one wideband receiver has a signal detector operatively connectable to the wideband receiver and a signal extractor operatively connected to the signal detector and connectable to the wideband receiver for performing signal extraction directly on a wideband signal output of the receiver and for performing the signal extraction only upon detection of a signal by the signal detector. The signal detector includes a generator of a coarsely sampled or decimated time-frequency representation of the wideband signal output. The time-frequency representation is decimated or coarsely sampled in time compared to an inverse frequency filter bandwidth used in the time-frequency representation. The generator preferably includes a digital filter bank. The digital filter bank in turn may include means for performing a sequence of windowed FFTs on samples of the wideband signal output, wherein a stride between consecutive one of the FFTs is considerably larger than a length of each of the FFTs.

42 Claims, 1 Drawing Sheet

APPARATUS AND METHOD FOR A DIGITAL, WIDEBAND, INTERCEPT AND ANALYSIS PROCESSOR FOR FREQUENCY HOPPING SIGNALS

FIELD OF THE INVENTION

This invention relates to a system that intercepts and/or analyses communications or radar signals, and more specifically to the detection and extraction of communications or radar signals with little or no knowledge of the signals themselves for subsequent analysis by an interceptor.

BACKGROUND OF THE INVENTION

Interception and analysis of communications and radar signals plays a significant role in a number of applications including, but not limited to, analysis of signal bandwidths for spectral congestion analysis, signal characterization for regulatory enforcement, analysis of signal characteristics for intelligence gathering and possibly jamming of the intercepted signals in order to disrupt enemy communications. Signals of interest include transmissions wherein the signal frequency either is constant or varies with time (such as frequency-hopping radios or frequency-agile radars) and wherein the signal duration is either constant or varies with time. Reasons for using frequency-hopping or agile transmissions include making the signal more difficult to intercept and/or jam (low probability of intercept or LPI), and making signal reception more robust for the intended receiver by introducing diversity or redundancy over multiple frequencies.

The intended receiver of the signal transmissions has adequate knowledge of the key transmission characteristics (such as the hopping frequencies of the frequency-hopping radio) to extract the information-bearing signal of interest and the signal information thereafter. On the other hand, the interceptor generally has no access to such knowledge. Indeed, the interceptor generally lacks knowledge of even the existence of signals in the bandwidth of interest at any given time, or of how many signal emitters there are. Clearly the interceptor must extract any required information by monitoring and processing the bandwidth of interest.

This total lack of knowledge about the characteristics of the transmissions means that the interceptor is at a disadvantage with respect to noise relative to the intended receiver, assuming that the intended receiver is properly designed. It is therefore important to minimize this penalty in order to maximize the effectiveness of the intercept receiver. This is accomplished by careful design of the intercept receiver.

The presence of multiple signal emitters creates additional problems for an intercept receiver. They can interfere with the detection of each other, as well as force the interceptor to duplicate processes (filtering, etc.) required in the estimation of their parameters. In addition, the sequence of hops that belong to each emitter needs to be resolved.

The fine-grained signal information potentially obtainable with an intercept receiver is considerable (see "A Fast Software Implementation of a Digital Filter Bank Processor for Analyzing Frequency Hopping Signals," Al Premji, Tim J. Nohara, Robert Inkol and William Read, presented at the TTCP Digital Receiver Technology Workshop, Ottawa, Canada, Sep. 10–12, 2001). It can extract the individual hop signals, calculate numerous estimates from these hop signals (e.g. start time, end time, hop duration, rise time, fall time, bandwidth, modulation type, bit rate, bearing, power, etc.) and then, assuming that there are multiple emitters present in the sub-band, the hops can be deinterleaved (using multi-dimensional clustering or association algorithms that operate on the estimated parameters) so that the hop signal sequence from each emitter is determined. Each emitter's hop signal sequence would then form part of a message that could, in theory, be demodulated and decoded (i.e. signal exploitation) to the same degree that single-channel signals can be exploited.

In order to support jamming of frequency-hopping signals (or other LPI signals), intercept receivers must be able to disrupt the majority of the signal information contained in each signal hop. This means that the intercept receiver must be able to detect and locate (in frequency, and possibly bearing) a given hop signal within a fraction of the hop signal's duration. For example, if a 10 millisecond (ms) hop signal (i.e. hop rate of the radio is approximately 100 hops/sec) is assumed, the hop signal would ideally be detected and located in about 1 ms, so that a jamming signal can be transmitted to disrupt signal reception by the intended receiver for the remainder of the signal duration.

The fine-grained signal information obtainable is considerable if an intercept receiver dwells long enough within a sub-band occupied by a frequency hopper. For the 10 ms hop signal example, it could dwell in each sub-band for say 100 ms, detect the individual hops (about ten of them for each emitter), extract the individual hop signals, calculate estimates from these hop signals, and then deinterleave. Such fine-grained signal information is more easily obtainable using digital processors. As a result, even if the front-end receiver is analog, once signals are extracted for fine-grained analyses, the remaining processing, such as parameter estimation and deinterleaving (deinterleaving is the process of determining the number of emitters present and creating hop sequences for each emitter), would normally be implemented in software.

Two technologies are possible for receiver implementation, analog processing and digital processing. Although analog processors have been the traditional choice for intercept receivers due to the computational burden of digital processing, analog processors have numerous limitations that constrain their utility. Some of the problems include: greater size, power requirements and cost, lower reliability and repeatability of components, limitations and lack of accuracy in providing important characteristics of the signals of interest, and inflexibility (in terms of changing or improving the systems or processing algorithms employed, or migrating them to other bands of operations or applications). Some of these problems are compounded by multiple signals in the bandwidth being monitored. For these reasons, emphasis has recently shifted to an increased consideration of digital techniques. A thorough treatment of analog and digital wideband receiver systems is provided in the book "Digital Techniques for Wideband Receivers," James Tsui, Second Edition, Artech House, 2001.

For digital processing, the signal must first be converted to discrete samples that represent the signal voltage or amplitude over time. The resulting sampled signal places a considerable computational burden on a digital receiver required to process said captured signal. Indeed, this is one of the primary reasons that, at the present time, most intercept receivers are still implemented in analog form (to circumvent the requirements of digital processing). The few digital receivers that either have been implemented or have been described in concept in the open literature resort to substantially sub-optimal solutions. These sub-optimal solutions usually perform detection using a noise/interference bandwidth that far exceeds the desired signal bandwidth, thereby degrading sensitivity; or they throw away signal information (i.e. the underlying, complex narrowband hop signal is not retained for further analysis and exploitation). They must do so in order to reduce the digital processing requirements and to make the solution practical for implementation using available digital technology. As a result, the utility of these receivers for extracting valuable signal information is also limited.

ANALOG RECEIVERS OVERVIEW

A number of different types of analog intercept receivers are described in the open literature. There are generally two categories of such receivers, scanning receivers and channelized receivers. Hybrid receivers use a combination of the techniques pertinent to the two categories.

A scanning receiver scans the band of interest in sub-bands by stepping through the band of interest and dwelling briefly in each sub-band to analyse the received energy. Analysis generally takes the form of detection of signal energy within the sub-band followed by frequency estimation of detected signals using an approach such as an Instantaneous Frequency Measurement Receiver (see "Digital Techniques for Wideband Receivers," James Tsui, Second Edition, Artech House, 2001).

Channelized receivers attempt to cover a larger instantaneous bandwidth by using a bank of filters, each of which covers a sub-band of the bandwidth of interest (see "Digital Techniques for Wideband Receivers," James Tsui, Second Edition, Artech House, 2001). (The entire bandwidth of interest could be covered using a set of stacked, channelized receivers, in order to achieve a sufficiently high probability of intercept.) For a given channelized receiver, the receiver transforms signals into their respective filter bands, so that detection and analysis can be performed on each filter band. Signal analysis can then proceed separately on each of the sub-bands covered by the bank of filters. The large number of filters and processing hardware required precludes simultaneous or instantaneous coverage of a large bandwidth, and consequently channelized receivers often include techniques such as band-folding or multiplexing to cover a wider bandwidth (see "Channelized Receiver: A Viable Solution for EW and ESM Systems," Donald E. Allen, IEE Proceedings, vol. 129, Pt. F, No. 3, June 1982, pp.172–179). Analog filter banks, while effective for real-time processing, result in systems that are heavy, expensive and inflexible (processing can not be changed easily). Also, channel matching between different RF channels (for example, for a direction-finding (DF) antenna) places additional constraints.

Compressive receivers, which exploit properties of dispersive delay lines or surface acoustic wave devices, can be thought of as special cases of an analog channelized receiver. Compressive receivers transform signals occurring at different instantaneous frequencies into pulses that occur displaced in time. Time-domain detection of the pulses can then be performed to detect the presence of a hop signal, and its frequency can be estimated by the displacement in time associated with its detected pulse (see "Digital Techniques for Wideband Receivers," James Tsui, Second Edition, Artech House, 2001). While effective for real-time processing, compressive receivers have a limited dynamic range (which makes the detection of small signals impossible in the presence of large signals), are heavy, expensive, they require significant power, and they are inflexible. Again, channel matching between RF channels is a problem.

Hybrid receivers come in several different arrangements. A hybrid receiver could, for example, use a channelized receiver that is preceded by a step scanning front-end in order to cover a wider bandwidth over time. Another example of a hybrid design uses a search receiver of the scanning type whose function is to scan the entire bandwidth of interest as quickly as possible in search of interesting signal activity. Sub-bands with interesting signal activity are then processed by one or more channelized receivers which dwell long enough in each sub-band to extract meaningful, fine-grained signal information.

Jamming requirements place considerable constraints on the design of analog intercept receivers (see "Digital Techniques for Wideband Receivers," James Tsui, Second Edition, Artech House, 2001). Scanning, channelized and hybrid receivers have been proposed as solutions. Since these analog receivers can be designed to have a quick reaction time to trigger jamming, they can also be used also be used to switch-in or trigger other narrowband receivers to perform fine-grained signal analysis on the signals of interest. The frequency estimate of each detected hop signal can be used to tune a narrowband receiver to that hop, so that the remainder of the hop signal can be received and analysed.

DIGITAL RECEIVERS OVERVIEW

As noted earlier, digital (software) implementations of interception processing provide considerable benefits compared to analog implementation due to the flexibility to substantially change the processing algorithms without the need to change the hardware. In addition, a digital implementation can reap the benefits of improved processing speeds over the life cycle of an interceptor system, without the need to re-write the software. In this way, performance benefits can be obtained without the commensurate increase in costs associated with analog systems.

In general, the signals of interest can span a considerable bandwidth, as little as a few kilohertz (kHz) or megahertz (MHz) to as much as a few gigaHertz (GHz). The required sampling rate (in accordance with the Nyquist principle) must be twice the bandwidth of interest for a complete signal representation. For example, a frequency-hopping radio may have an instantaneous bandwidth of tens of kHz, however it may hop over a few tens of MHz or greater, requiring the intercept receiver to cover the larger hopping bandwidth in order to extract valuable signal information. Furthermore, the dynamic range requirements for representing the time-varying amplitude of the signals of interest depends on the application and type of information sought from the intercepted signal. For interception and analysis of LPI communications signals, as an example, the required dynamic range generally dictates in excess of 12 to 14 bits of precision. Digital implementations of intercept receivers must then process signal samples produced in accordance with the indicated sampling and dynamic range requirements.

However, digital implementations of intercept receiver processing have not received any significant consideration until recently (see "A Fast Software Implementation of a Digital Filter Bank Processor for Analyzing Frequency Hopping Signals," Al Premji, Tim J. Nohara, Robert Inkol and William Read, presented at the TTCP Digital Receiver Technology Workshop, Ottawa, Canada, Sep. 10–12, 2001) due to the inability to meet the processing speed requirements. Recent improvements in processing speed have sparked some interest in digital implementations using special-purpose Digital Signal Processing (DSP) boards, although this interest has been largely of an academic nature, since development on such special-purpose hardware still imposes limitations of cost, inflexibility of software development environments, and hardware interfacing.

Recent improvements in the speed of general-purpose processors (such as are used in Personal Computers) now make it possible to implement the processing for a signal interceptor/analyser in software in real-time on a general-purpose computer. This requires that the processing algorithms be suitably modified to exploit the processing capabilities of a general-purpose computer. Significant benefits of an implementation on a general-purpose computer (aside from removing the requirement for special-purpose hardware) include the flexibility provided, and the ability to harness constant increases in processing speeds as a result of advances in computing technology.

ADDITIONAL PRIOR ART

A broad overview of intercept receiver techniques as found in the open literature has been summarized in the preceding discussions. A good treatment is found in "Digital Techniques for Wideband Receivers," James Tsui, Second Edition, Artech House, 2001. Relevant wideband intercept receiver techniques (in the context of the present invention) described in the open literature and in the patent literature are discussed next, the substantial differences between these techniques and the subject approach of the present invention being described hereinafter, in the section entitled "Summary of the Invention."

U.S. Pat. No. 5,440,636 issued Aug. 8, 1995 (Apparatus and Method for Processing of Frequency Hopping Communications) describes an intercept receiver invention implemented in hardware which is of the compressive receiver type described earlier. A significant portion of the apparatus is implemented using analog hardware, including a number of Dispersive Delay Lines (DDL), which are often implemented using Surface Acoustic Wave (SAW) devices. Some of the logic-related operations are performed in digital hardware. The apparatus relies on the linear FM characteristics of the DDLs to generate time-staggered pulses, where the time stagger is a function of the frequency of the input signal. These pulses are subsequently used to generate corresponding linear-FM signals to be demodulated, and the same pulses are also fed to detection-analysis hardware. Detection is performed on a one-dimensional, time-domain signal. The hardware generates an appropriately delayed chirp signal to be used for demodulating the pulse-generated chirps with a mixer. Accurate delay in the DDLs and other components is paramount for good demodulated-signal SNR.

Although the primary discussion in U.S. Pat. No. 5,440, 636 is aimed at single input signals, there is a brief discussion of application in a multiple-signal environment by replicating a portion of the apparatus. For each additional input signal to be demodulated, this requires at least duplicating: the detection-analysis hardware, the demodulation chirp-generation DDL, the demodulating mixer, and the filter-demodulator-monitor chain following the mixer. The need for replication of hardware will add to the size, cost, and power requirements, and it will also place greater requirements on timing accuracies and component matching. Furthermore, timing-induced SNR problems will be compounded due to the interference from multiple signals. The complexity of the hardware will also increase with the number of input signals. The multiplicity of hop rates for multiple input signals (particularly hop rates that are related by an integer multiple) will also further add to the complexity of the detection-analysis hardware.

U.S. Pat. No. 5,239,555 issued Aug. 24, 1993 (Frequency Hopping Signal Interceptor) uses a scanned compressive receiver to sample the input signal and generate a pulse whose time delay is proportional to the frequency of the input signal. The scan rate of the compressive receiver is higher than the expected hop rate so that all hops are intercepted. The scan period, number, frequency (based on delay), and time of occurrence are recorded in a histogram maintained in Random Access Memory (RAM). A processor analyzes the accumulated data in the histogram to determine the total hopping bandwidth, hop channel spacing, hop rate, dwell time or hop duration, hop frequencies, and number of frequencies.

U.S. Pat. No. 5,239,555 uses a statistical process to analyse a single FH signal (or a group of transmitters operating within a network wherein no two transmitters transmit signals simultaneously).

U.S. Pat. No. 4,843,638 issued Jun. 27, 1989 (Receiver for Frequency-hopped Signals) describes a receiver wherein a receiving antenna and matching unit feed a mixer whose second input is fed by a unit that generates a comb of frequencies. The frequency tones are spaced by the expected channel spacing, and cover the required analysis bandwidth. The output from the mixer is fed to a bandpass filter followed by a demodulator. The comb of tone frequencies ensures that the demodulator filter always intercepts a signal component within the analysis band. This signal can then be demodulated for further processing within the demodulator block. The patent notes that there may be a requirement for some tuning to ensure that the comb of tones corresponds to the transmit channels for the FH transmitter.

U.S. Pat. No. 4,843,638 is an analog intercept receiver that is fundamentally only able to process a single signal at a time. Furthermore, the mixing operation employed will cause noise from the entire processed input bandwidth to degrade detection sensitivity. Also, the existence of multiple signals will introduce severe signal-to-noise-ratio (SNR) degradations, since all of the other signals will serve as interferers with respect to any one of the signals in the demodulator passband. Finally, the mixing operation assumes a specific signal channelization across the band.

U.S. Pat. No. 4,933,954 issued Jun. 12, 1990 (Device for Recombination of a Message Transmitted by a Frequency Hopping Transmitter) employs a fast, digital, FFT search receiver to detect each individual hop of a frequency hopping signal, to determine its instantaneous frequency, and then, to cause a second intercept receiver to switch (i.e. tune) to the said instantaneous frequency in order to intercept that particular hop signal. A suitable amount of storage of the digitized wideband signal presented to the FFT of the search receiver is built into the system, so that the intercept receiver does not lose any of the hop signal before it is switched by the search receiver. In this way, the intercept receiver is able to track or follow the frequency hopping signal. The patent does not discuss the intercept receiver in any detail, other than it can be analog or digital. No mention of the detection, estimation or demodulation processes of the intercept receiver is made.

Consider next the high-frequency (HF), real-time, signal detection, classification and parameter estimation system described in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994. This system is a hybrid system as described earlier, that uses a scanning front-end followed by a digital, channelized receiver, whose objective is to search out unknown, short-time (100 ms to 1 s), narrowband signals (each signal can have a bandwidth up to 5 kHz), and to determine the underlying modulation class, and subsequently to estimate related parameters such as baud rate and exact center frequency. While no mention of frequency hopping or low-probability-of-intercept (LPI) signals is made (indeed the minimum signal duration of 100 ms is far greater than the duration of typical frequency hopping signals), the techniques employed are relevant. The front-end consists of a scanning digital receiver that scans over the HF band (3 to 30 MHz) band, and provides a 9 kHz instantaneous bandwidth for a dwell time of about 1 second. The received signal is sampled at 22.2 kHz and the signal is transformed to the time-frequency (TF) plane using a polyphase filter bank (which provides more flexibility than an FFT in that it can provide a non-uniform set of filters in the filter bank) with the smallest filter width being 43.4 Hz (i.e. equivalent to the width obtained by performing a 512 point FFT on the input signal). Detection is performed on the TF plane signals by first averaging the spectral lines and then performing a one-dimensional (across frequency) detection. Detected signals are characterized by their peak power, center frequency and bandwidth. The complex baseband signals associated with each detected signal are resynthesized from the TF plane complex data using reconstruction techniques such as those in the article "Perfect Reconstruction Filter Banks with Rational Sampling Factors," Jelena Kovacevic and Martin Vetterli, IEEE Transactions on Signal Processing, Vol.41, No.6, June 1993. Next, a classifier is employed on each complex baseband signal to determine the underlying signal modulation. With this information, additional parameters are estimated such as baud rate.

Finally, consider the (HF) wideband, multi-channel direction-finding (DF) system described in the publication "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999. This system has 3 RF channels available from a DF antenna that are used to estimate bearing (i.e. azimuth) information associated with detected signals, including LPI signals. Each receiver channel digitizes the signal received in a 1.2 MHz sub-band of the HF band. A filter bank is implemented using similar polyphase filtering concepts employed in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994, and in fact, that publication is referenced in "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999. Five consecutive spectral lines are averaged together to produce a better DF statistic for estimating azimuth. The resulting spectral lines are accumulated over time (e.g. several seconds) and produce a TF representation of the input signals. Along each spectral line, detection is performed by integrating energy in adjacent frequency bins to determine the extent (bandwidth) of a given signal component. Each detection is then analyzed in time for persistence. Detections are discarded as impulse noise if their azimuth estimates vary wildly in time; if they cluster, then a valid detection is declared. Valid detections are determined to be frequency hoppers if they are bursty in nature (i.e. they appear, and then disappear). The paper does not consider signal extraction and fine-grained signal analysis (e.g. endpointing, modulation recognition, demodulation, deinterleaving, etc.) in any detail, accept to suggest that complex baseband signal reconstruction could be performed from the TF plane data as suggested in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994, or alternatively, by supplying the stored, wideband signals to a narrowband receiver for further processing.

OBJECTS OF THE INVENTION

An object of this invention is to provide a digital signal interception and analysis processor that is well suited for intercepting low probability of intercept (LPI) signals such as frequency-hopping (FH) radio signals and/or frequency-agile radar transmissions.

Another object of this invention is that the provided processor is also capable of intercepting and analyzing single-channel (non-frequency-varying) signals.

Yet another object of the present invention is that the provided signal interception and analysis processor be of low cost as compared to other receivers/processors.

A key object of the present invention is that it operates efficiently (with reduced computations as compared to state-of-the-art receiver/processors) so that it can operate in real-time.

Yet another object of the present invention is that due to its operational efficiency, it can process a greater signal bandwidth for a given amount of processing hardware.

A further object of the present invention is that it provides improved interception and analysis of LPI signals compared to other current state-of-the-art approaches.

Another key object of the present invention is to provide a signal interception and analysis processor that can be implemented in real-time on a general-purpose computer.

Another key object of the present invention is to provide a signal interception processor that can detect multiple simultaneously occurring signals.

A further key object of the present invention is to provide a signal interception processor that can delineate in frequency and time multiple simultaneously occurring detected signals.

A further key object of the present invention is to provide a signal interception processor that can extract multiple simultaneously occurring signals so that the extracted signals match the actual frequency and bandwidth of the signals as well as the time duration of the signals.

Yet another key object of the present invention is to provide a signal interception processor that can detect and extract simultaneously occurring signals from multiple channel receivers.

Yet another key object of the present invention is to reliably detect, estimate $1^{st}$-level parameters, and extract frequency-hopped signals, so that subsequent reconstruction of the sequence of hops from each emitter (deinterleaving), as well as other signal exploitation processes (e.g. message recovery) are possible.

Another key object of the present invention is to extract signals of sufficient fidelity so that accurate estimation of their important $2^{nd}$-level parameters (e.g. time of occurrence, rise time, fall time, duration, centre frequency, bandwidth, direction(s) of arrival, power, modulation parameters, etc.) is possible.

A further key object of the present invention is to extract signals of sufficient fidelity so that demodulation is possible.

Another object of the present invention is that its design supports jamming of frequency-hopping signals.

Another key object of the present invention is that it is well suited for use in wideband intercept receiver systems operating in the very high frequency (VHF) band (e.g. 30 to 88 MHz).

Another object of the present invention is that it is well suited for use in wideband intercept receiver systems with an arbitrary instantaneous bandwidth.

Another object of the present invention is that its design and implementation are readily scalable to other bands (e.g. the HF and the ultra high frequency (UHF) (e.g. 200 to 500 MHz) bands).

Another key object of the present invention is to provide a flexible design and implementation that can readily and cost-effectively take advantage of improvements in computer processing technology, and in signal processing algorithm developments.

These and other objects of the invention will be apparent from the drawings and descriptions hereof. It is to be noted that each object of the invention is achieved by at least one embodiment of the invention. However, it is not necessarily the case that every embodiment of the invention meets every object of the invention as discussed herein.

SUMMARY OF THE INVENTION

The present invention involves an apparatus for multiple signal interception and extraction (and analysis) that is suitable for real-time implementation on present-day, general-purpose computers. The apparatus provides capabilities that are equivalent to special-purpose DSP hardware while retaining the benefits of a general-purpose computer. There is no known similar apparatus described in the literature or in operation today that is capable of the same real-time operation on general-purpose computers, and achieving the same intercept performance.

More particularly, the present invention concerns a particular design of a wideband, digital, intercept receiver that is capable of detecting and extracting LPI signals such as frequency-hopping signals in real-time; and supports subsequent parameter estimation, deinterleaving, signal exploitation, and jamming operations. The present invention assumes that a wideband receiver (one or more) is available that dwells on a particular sub-band of interest, and acquires and digitizes wideband signal data for further processing. The focus of the present invention concerns the digital signal processing that follows signal digitization, and includes detection, $1^{st}$-level parameter estimation, and signal extraction processes. The particulars of the wideband receiver design preceding the analog-to-digital converters (ADC) and the subsequent parameter estimation, deinterleaving, signal exploitation and jamming processes following signal extraction are not critical to this invention and can take many forms known to those skilled in the art, some of which have been discussed in the Background of the Invention section. If the wideband intercept receiver system is logically partitioned into three functional blocks, namely the front-end wideband receiver(s) (up to and including the ADCs), the LPI signal intercept and analysis processor (from the output of the ADCs and including signal detection, $1^{st}$-level parameter estimation and extraction of the narrowband, time-domain signal corresponding to each detected signal), and the post-extraction processor (which performs $2^{nd}$-level parameter estimation, deinterleaving, signal exploitation, and jamming functions, as required), then the present invention concerns the apparatus and methods associated with the LPI signal intercept and analysis processor (SIAP).

The objects of the present invention are thus accomplished by an apparatus and methods for the SIAP that use novel signal processing algorithms which exploit the structure of frequency-hopping signals in order to realize a time-frequency (TF), digital filter bank solution that saves orders of magnitude in computations as compared to digital filter bank (DFB) solutions proposed in the prior art. As a result, the present invention is amenable to real-time implementation in software running on a general-purpose computer.

In particular, previously proposed approaches for a TF DFB require processing the signal at the Nyquist rate in order to preserve the signal at the output of the DFB for reconstruction, once detected. Proposed solutions avoid any gaps in signal data so that loss of information for downstream processing does not result. The present invention concerns a SIAP that deliberately decimates the signal data (i.e. under-samples or leaves gaps) before and during the TF digital filter bank operation. The coarseness in time (relative to the inverse of the filter bandwidth) saves orders of magnitudes in computation, but of course, precludes accurate signal extraction using the reconstruction approaches proposed in the prior art (see the discussion on such reconstruction approaches in the Background of the Invention above). Accurate signal extraction can be performed, however, by employing signal extraction filters (usually assumed to be expensive computationally) directly on the wideband input signal data. The computational benefits of this approach are only realized when one examines in detail the signal structure in the TF plane of LPI signals such as frequency-hopping signals, and performs detailed calculations to determine the total number of operations needed for both the DFB/detection operation and the signal extraction operation. The relatively long duration of individual hop signals (e.g. 10 ms) as compared to the inverse filter bandwidth (which is usually related to the hop signal bandwidth), combined with the relative sparseness of hop signals in the TF plane result in orders of magnitude of savings in total number of computations.

A signal intercept and analysis processor for a wideband intercept receiver system including at least one wideband receiver comprises, in accordance with the present invention, a signal detector operatively connectable to the wideband receiver, and a signal extractor operatively connected to the signal detector and connectable to the wideband receiver for performing signal extraction directly on a wideband signal output of the receiver and for performing the signal extraction only upon detection of a signal by the signal detector.

Pursuant to another feature of the present invention, the signal detector includes a generator of a time-frequency representation of the wideband signal output. The time-frequency representation may be decimated or coarsely sampled in time, compared to an inverse frequency filter bandwidth used in the time-frequency representation.

The generator preferably includes a digital filter bank. The digital filter bank in turn may include means for performing a sequence of windowed FFTs on samples of the wideband signal output. In that case, a stride between consecutive FFTs may be considerably larger than the length of each of the FFTs.

The signal intercept and analysis processor may further comprise a buffer connectable to the receiver on one side and connected to the detector and the extractor on another side.

A related signal intercept method for a wideband intercept receiver system comprises, in accordance with the present invention, analyzing a wideband signal output of a wideband receiver to detect whether a signal is present in the wideband signal output and, upon detecting the presence of a signal in the wideband signal output and only upon detecting the presence of a signal in the wideband signal output, extracting the signal directly from the wideband signal output.

In this method, the analyzing of the wideband signal output preferably includes generating a time-frequency representation of the wideband signal output, for instance, by operating or utilizing a digital filter bank. Where necessary, for instance, to conserve processing time or power, the time-frequency representation may be coarsely sampled or decimated in the time domain. The operating or utilizing of the digital filter bank may include performing a sequence of windowed FFTs on samples of the wideband signal output. Preferably, a stride between consecutive FFTs is considerably larger than a length of each of the FFTs.

A signal intercept and analysis processor for a wideband intercept receiver system comprises, in accordance with another embodiment of the present invention, a digital filter bank and a signal detection component, where the digital filter bank generates a coarsely sampled or decimated time-frequency representation of a wideband signal output of a wideband receiver of the wideband intercept receiver system, the time-frequency representation being coarsely sampled or decimated in a time domain and fully represented in a frequency domain. The signal detection component is operatively connected to the digital filter bank for analyzing the time-frequency representation to detect the presence of a signal. As discussed above, the digital filter bank may include a means for performing a sequence of windowed FFTs on samples of the wideband signal output, a stride between consecutive FFTs preferably being considerably larger than a length of each of the FFTs.

In an associated signal intercept and analysis method, a coarsely sampled or decimated time-frequency representation of a wideband signal output is generated, the time-frequency representation being coarsely sampled or decimated in a time domain and fully represented in a frequency domain. The time-frequency representation is analyzed to detect the presence of one or more signals. Coarse end points may be computed and used to determine an extent of samples of the wideband signal output, whereas a center frequency for each signal may be estimated and used as a filter center frequency to extract the respective detected signal directly from the wideband signal output. In addition, a bandwidth for each signal may be estimated and used in the extraction process to limit the extracted bandwidth of each detected signal.

Pursuant to an additional feature of the present invention, coarse end points and an estimated center frequency are outputted for each detected signal. Signal energy may be centroided in frequency to estimate the center frequency for each detected signal. Each centroided center frequency estimate may then be used to extract the respective detected signal from the wideband signal output. It is to be noted that the extracted signals can be decimated in accordance with their respective bandwidths.

COMPARISON OF INVENTION WITH PRIOR ART

The present invention has none of the analog-related, compressive-receiver-type limitations of U.S. Pat. No. 5,440,636, because the subject invention is a full digital implementation. As a result, the subject invention relates to intercept receivers that are smaller, less expensive, lower power, flexible and programmable, and able to handle signals with much larger dynamic ranges. Furthermore, the algorithms and techniques that are a part of the present invention provide an inherent ability to naturally handle a multiplicity of input signals with a multiplicity of signal parameters without performance deterioration. Finally, the detection techniques employed are two-dimensional (time and frequency) rather than one-dimensional (time only) and hence intercept receivers built in accordance with the present invention will have greater sensitivity than those using compressive receivers.

In contrast to U.S. Pat. No. 5,239,555, the invention of the present patent application is capable of extracting and analysing all signals within the analysis bandwidth, regardless of their number and the network within which they operate. In addition, U.S. Pat. No. 5,239,555 retains only statistical detection information (in the histogram) whereas the present invention not only performs detection and estimation functions, but also retains and extracts the sequence of samples for all of the detected signals. Extraction of signal samples allows considerable latitude for both the fine-grained analysis of detected signals and the accurate estimation of signal parameters. The invention disclosed in U.S. Pat. No. 5,239,555 is of the compressive-receiver-type, and hence suffers the same disadvantages with respect to the present invention as described above in comparison to the invention in U.S. Pat. No. 5,440,636.

In contrast to the analog intercept receiver or U.S. Pat. No. 4,843,638, the apparatus of the present invention is digital and inherently able to handle multiple signals, does not assume a signal channelization, and maximizes detection sensitivity by filtering out noise from the input bandwidth that is outside a narrow band surrounding each signal. The solution of U.S. Pat. No. 4,843,638 is a hardware solution in contrast to the highly flexible and cost effective software solution proposed in the current invention.

The receiving system considered in U.S. Pat. No. 4,933,954 will only work when only a single frequency-hopping signal is present in the wide input bandwidth of the search receiver. Secondly, detection is performed using only one dimension (frequency) and with short data segments to minimize the detection latency and internal storage required. This necessarily reduces the detection sensitivity that is otherwise possible if detection is performed in two-dimensions (time and frequency). Thirdly, a complex synchronization scheme (dependent on memory length, search receiver processor latency time, intercept receiver tuning time, etc.) is needed to avoid loss of signal data. The present invention as described herein overcomes all of these shortcomings.

While there are similarities between the HF system proposed in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994, and the present invention described in this patent disclosure (e.g. both use digital receivers combined with off-the-shelf computers and software to implement the processing, both concern detection, parameter estimation and classification functions, both make use of a filter bank which transforms the wideband signal into the TF plane), several key differences should be noted. The first difference to be noted is that the HF system in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994., was not intended by design to handle frequency hopping (FH) signals. Hence, there is no mention or need for deinterleaving. Secondly, the HF system meets real-time for a very small, instantaneous, receiver bandwidth of just 9 kHz. With a stated dwell time of 1 second on each 9 kHz sub-band, it would take about 3,000 (27 MHz/9 kHz) seconds or 50 minutes to perform detection and classification over the entire HF band. This processing time is far too long to be useful for military applications against LPI signals; and although the authors argue that the system is scalable, there is no evidence to suggest that a resulting, higher-bandwidth solution could be implemented in real-time using similar hardware and software. In order to scale this solution to the problem considered in this patent disclosure, instantaneous bandwidths in the several MHz range would be needed, at a minimum, which are about three orders of magnitude more complex from a real-time computational viewpoint. A third key difference between the HF system in "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994, and the present invention is that the HF system performs signal extraction using the complex data in the TF plane, whereas the present invention does not. Later in this disclosure, it is shown that performing signal extraction from the TF plane results in a solution that is not amenable to a real-time, software implementation using off-the-shelf computers, which is a key feature of the present invention.

The system reported in "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999, also has some similarities and key differences with systems that are designed in accordance with the present invention described herein. Both systems process wideband signal data in order to detect the presence of LPI signals such as FH signals. Both employ multiple RF channels for the purpose of estimating bearing information. The system reported in "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999, uses a DSP solution (a PowerPC cluster) to achieve real-time performance whereas the present invention requires only an off-the-shelf, general-purpose computer, which is less expensive, and more flexible. The system reported in "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999, only implements detection processing in real-time over a 1.2 MHz bandwidth, whereas the present invention can implement detection, extensive parameter estimation, and signal extraction for numerous detected signals, all in real-time over at least a 4.3 MHz signal bandwidth (see "A Fast Software Implementation of a Digital Filter Bank Processor for Analyzing Frequency Hopping Signals," Al Premji, Tim J. Nohara, Robert Inkol and William Read, presented at the TTCP Digital Receiver Technology Workshop, Ottawa, Canada, Sep. 10–12, 2001). The signal extraction (reconstruction) technique proposed in "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999, is not generally amenable to real-time implementation, and is a key difference from the signal extraction techniques used in the present invention, as is discussed later herein.

DESCRIPTION OF THE PREFERRED EMBODIMENT

Figure 1:
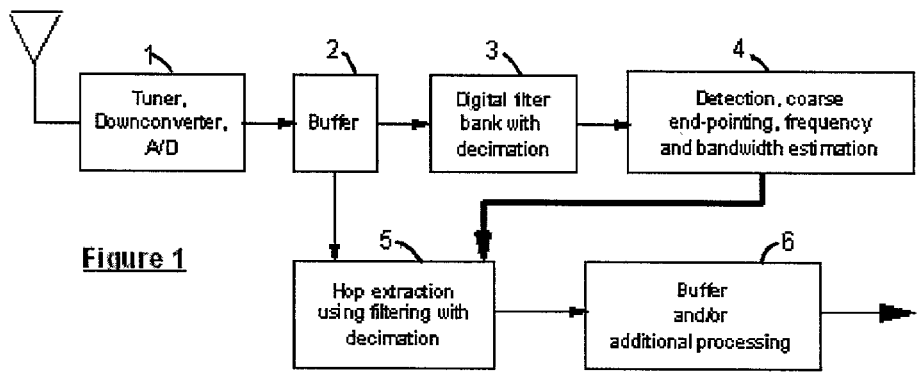
FIG. 1 is a block diagram of a general, wideband, intercept receiver system which includes the fundamental form of the present invention.

FIG. 1 shows a wideband intercept receiver system that can be logically partitioned into the three functional blocks described earlier. The first block is the front-end wideband receiver(s) (up to and including the ADCs) which is represented by block 1 in FIG. 1. The LPI signal intercept and analysis processor (from the output of the ADCs and including signal detection, $1^{st}$-level parameter estimation and extraction of the narrowband, time-domain signals corresponding to each detected signal) is represented by blocks 2, 3, 4 and 5 in FIG. 1, and is the primary focus of the present invention. The post-extraction processor (which performs $2^{nd}$-level parameter estimation, deinterleaving, and signal exploitation functions, as required, and which can even include jamming, for the purposes of this invention) is represented in FIG. 1 by block 6.

In its preferred embodiment, the SIAP (blocks 2, 3, 4 and 5 in FIG. 1) is implemented in software on a general-purpose computer, and runs in real-time. This form of implementation is preferred because it is inexpensive to build, maintain and change, it can be reprogrammed or reconfigured easily in software for many modes of operation or applications of interest, and it can naturally take advantage of the continuous improvements in computer technology (cost reduction, computational speed increases, memory improvements, size and weight and power reductions, operating system flexibilities, improvement in development tools, etc.) to improve system performance (e.g. with an increase in speed of the general-purpose computer, a larger instantaneous bandwidth can be processed in real-time, or the same instantaneous bandwidth can be processed more quickly, reducing system reaction time). The features of the SIAP that make it amenable for real-time implementation in software on a general-purpose computer are described herein. Although software implementation on a general-purpose computer is the preferred embodiment, other forms of implementation known to those skilled in the art (for example, using a digital signal processor (DSP) solution that involves hardware-specific software to process, communicate and move data between multiple DSP processors) are possible, and are within the scope of the present invention.

The front-end wideband receiver 1 consists of an antenna connected to a tuner, which in turn is connected to a downconverter followed by a digitizer. The tuner can either be set to a fixed frequency or it can be scanned or stepped in frequency, wherein it dwells at a given frequency for a certain amount of time before moving to the next frequency. At each frequency, a sub-band centred at that frequency is captured (i.e. sampled and digitized) with a bandwidth determined by the front-end bandwidth of the wideband receiver. The downconverter (which may be part of the tuner itself) translates the output signal of the tuner to baseband or some other intermediate frequency (IF). The digitizer samples and digitizes the signal from the downconverter to produce a digital representation of the signal. The digitizer is also often called an Analog-to-Digital Converter or ADC. The functionality embodied in block 1 is well known to those skilled in the art and may take on different forms as long as the final output is samples representing the received signal. The forms taken on by block 1 include those described in Background of the Invention and in references (see, for instance, "Digital Techniques for Wideband Receivers," James Tsui, Second Edition, Artech House, 2001; "Channelized Receiver: A Viable Solution for EW and ESM Systems," Donald E. Allen, IEE Proceedings, vol. 129, Pt. F, No. 3, June 1982, pp.172–179; "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994; "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999; "A Fast Software Implementation of a Digital Filter Bank Processor for Analyzing Frequency Hopping Signals," Al Premji, Tim J. Nohara, Robert Ikol and William Read, presented at the TTCP Digital Receiver Technology Workshop, Ottawa, Canada, Sep. 10–12, 2001). The description provided here is not intended to limit the scope of the invention in any way, as the invention can be used effectively with numerous forms of block 1. In the case of a multi-channel receiver (for direction of arrival estimation, for example), block 1 is assumed to be replicated to produce multiple sampled signals from multiple antennas, and portions of the replicated blocks may be combined for efficiency of implementation, as long as the end result is multiple sampled signals (one from each channel). Typically, the signal samples produced are complex (i.e. both the in-phase and quadrature components are sampled), since phase information is necessary for subsequent processing; however, IF sampling and processing (i.e., with real samples) could be used alternatively to achieve the same result.

Figure 2:
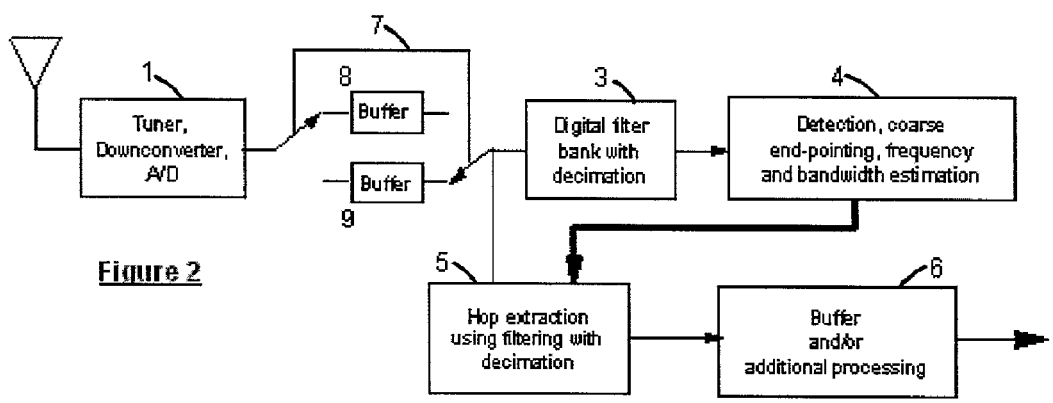
FIG. 2 is a block diagram showing a particular embodiment of the invention with two or more buffers or segments of buffers.

Signal samples produced by the front-end wideband receiver 1 are stored in a buffer represented by block 2. The buffer 2 represents any form of storage that is capable of storing digital data to be retrieved or read at some time following storage. The memory device and related control and access logic in a general-purpose computer is one form of such a buffer, although it may also be represented in some other form such as a dedicated memory device or hardware. Multiple buffers may be used for efficiency such that signal samples can be written to one buffer while a previously stored set of samples can be read from the other buffer and processed simultaneously. The use of multiple buffers or multiple segments of a single buffer used in said manner are shown in FIG. 2 (blocks 8 and 9 represent the case of two buffers or two segments of a single buffer, which can clearly be extended to an arbitrary number of buffers or segments without changing the scope of the invention) and such a configuration is also part of the invention. The logic controlling the reading and writing to separate buffers or segments of buffers is represented by buffer selector 7. The buffer selector 7 can take on numerous forms known to those skilled in the art; it can be effected by hardware switching, software switching, or a combination of both.

The size of each buffer or buffer segment and the resulting latency associated with the transfer of each buffer's signal data to block 3 in FIG. 1 are important considerations that need to be optimized depending on the mode of operation being performed by the SIAP. One mode of operation is the signal analysis mode, which is the usual mode of operation for the SIAP. In this mode, one preferred embodiment has each buffer in block 2 being of a size large enough to hold all of the signal data associated with a full dwell on a particular sub-band, and the data would be accessed by (read by) block 3 as a single contiguous block, after the entire dwell of data is recorded in the buffer by the front-end wideband receiver 1. For example, the wideband receiver might spend 100 ms acquiring data on each sub-band using a 5 MHz wide receiver, before retuning to another sub-band. If the complex digitization rate is also 5 MHz, then 500,000 complex samples (words) would be required to represent the signal in each receiver channel. The buffer size in block 2 would be large enough to accommodate all of the samples from all of the channels, and the signal samples would be accessed only after the dwell is completed. Assuming real-time operation is maintained throughout the system (i.e. the data is transferred to/from the buffer within 100 ms and the SIAP completes its processing within 100 ms, for this example), then the latency associated with the system would be at least 100 ms, and will be greater by the amount of time it takes to process the data block. While this amount of latency would be adequate for a signal analysis mode of operation, it would not be suitable for a frequency-hopping jamming mode of operation. In this mode, the system latency must be small compared to the duration of a given hop signal (e.g. 10 ms) so that each transmitted hop can be jammed during its transmission. Another preferred embodiment of the present invention provides suitable support for the jamming mode, and is a special case of the preferred embodiment of the signal analysis mode, which can be easily configured in software. In this embodiment, the transfer latency to/from each buffer is small compared to the hop signal duration. Consider an example of a signal data block of 1 ms in duration or 5000 data points in length (assuming the same 5 MHz digitization rate). The front-end wideband receiver 1 would transfer each signal data block immediately after digitization to the buffer 2; and block 3 would read one signal data block at a time, as soon as the data is available. Assuming real-time operation, the system latency would therefore be somewhat greater than 1 ms in this case. In this embodiment, the SIAP processor detects and reports (as described elsewhere herein) each detected hop and its associated parameters (e.g. time, frequency, bandwidth, etc.) to block 6 so that jamming can immediately follow in order to jam the remainder of each detected hop signal. The two modes of operation considered and the examples used to illustrate the generality of buffer 2 are in no way intended to restrict the scope of buffer 2 in the context of the present invention, or to restrict the reconfigurability or programmability of the SIAP, by virtue of its software implementation on a general-purpose computer.

Figure 3:
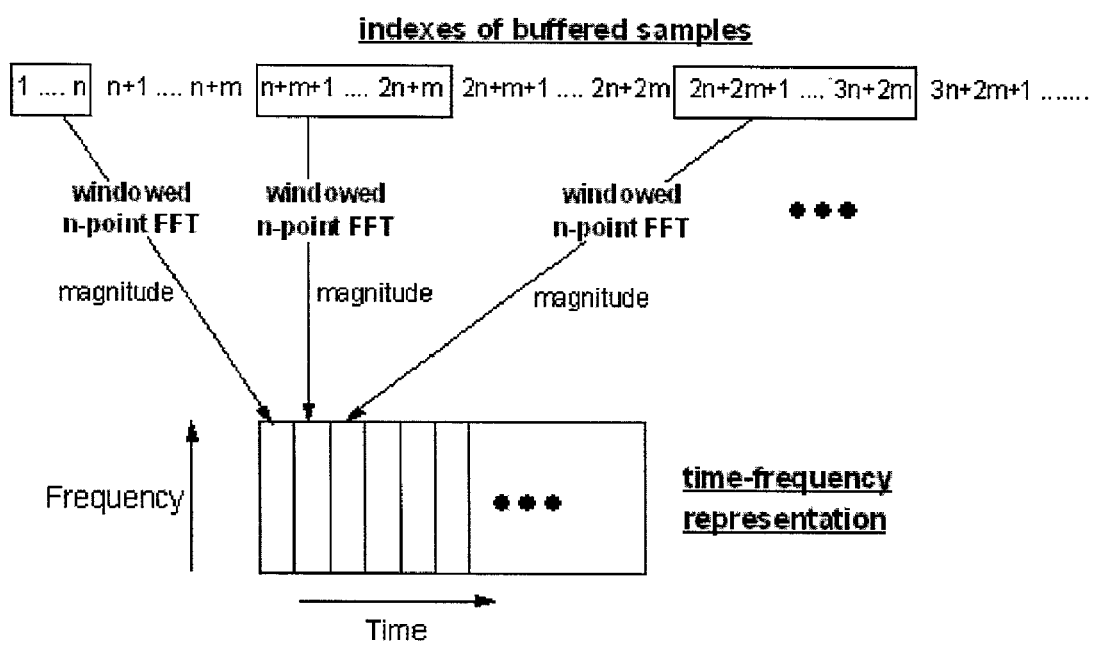
FIG. 3 is a diagram illustrating the decimation process used in the digital filter bank with decimation (block 3 in FIG. 1 and FIG. 2).

Signal samples saved to buffer 2 are next processed in block 3, the digital filter bank (DFB) with decimation (coarse digital filter bank), one of the four key blocks that form the SIAP and this invention. The DFB 3 processes the input data samples to generate a time-frequency (TF) representation of the buffered signal samples. Only the magnitude (or power) of the time-frequency representation need be retained for detection processing (Block 4). A unique feature of the DFB 3 is that while the signal is fully represented in frequency, the time representation is decimated significantly to save considerably on computations. In a preferred embodiment, the decimated time-frequency representation is generated by performing a sequence of windowed FFTs on the buffered samples, where the stride between consecutive FFTs is considerably larger than the length of each FFT. Windowing reduces signal spillover between frequency bins. FIG. 3 provides an example of this approach using n-point windowed FFTs with a stride of m. The stride, m, is selected based on the shortest expected signal duration (generally a few milliseconds for typical LPI signals) with the objective being to obtain one or more TF sample points for each LPI signal. Consider the example of a hop signal whose duration is 10 ms. If the stride, m, equates to 1 ms of time, then ten TF sample points can be expected from each hop signal present in the data. If the SIAP is operating in a signal analysis mode, it does not usually require more than 10 TF samples per hop to facilitate good performance from block 4. If operating in a jamming mode, the stride can be optimized so that only one TF sample is obtained per hop signal, if desired, to minimize the response time for jamming. The FFT length used in the DFB 3 is selected based on the expected signal bandwidths or channelization, and the density of signals. In the VHF band, for example, the FFT length might be selected to provide a frequency bin width between 25 kHz and 60 kHz. The computational savings due to decimation are of the order of m/n compared to a full-rate temporal representation or filter bank output. In general, this results in savings of as much as two orders of magnitude in the number of FFT computations needed, for typical sampling rates and signal bandwidths of interest. The savings are illustrated with an example, where a 60 kHz FFT bin width is assumed (i.e. a 16.6 microsecond (µs) signal duration is used for each FFT performed by DFB 3), and the stride is equated to 1 ms. Assuming a 50% signal overlap as would be typically used to account for FFT windowing loss, an FFT would be performed every 8.3 µs using the usual Nyquist approach adopted in the prior art (see below). With the decimated approach used in the present invention, a factor of 120 (1 ms/8.3 µs) fewer FFTs would be needed for this example, representing a huge computational savings. The quantity m is effectively the decimation factor of the time-frequency decomposition.

The FFT-based, preferred embodiment of the DFB 3 described above is not intended to limit the form of DFB 3 in FIG. 1. Those skilled in the art know that a number of other techniques can be used to generate a time-frequency representation, including filter banks based on multi-rate filtering and polyphase filtering (see "Digital Techniques for Wideband Receivers," James Tsui, Second Edition, Artech House, 2001), and other digital filtering algorithms (see "Perfect Reconstruction Filter Banks with Rational Sampling Factors," Jelena Kovacevic and Martin Vetterli, IEEE Transactions on Signal Processing, Vol.41, No.6, June 1993). Other techniques such as wavelet transforms and time-frequency distributions could also be used to generate a time-frequency representation. Any approach for generating a time-frequency representation is within the scope of DFB 3 in accordance with present invention if the TF representation is coarsely sampled (or decimated) in time compared to the inverse frequency filter bandwidth(s) used in the TF representation. The output time-frequency representation is next processed in block 4.

It should be noted that in implementations of signal detection/extraction processors employing a DFB found in the prior art, the DFB is implemented at the Nyquist rate (effectively the sampling rate divided by n, or even a factor of two greater than that if signal overlap is used to account for windowing loss). Also, the sampled signals to be extracted are taken directly from the DFB output, or alternatively reconstructed using reconstruction filters operating on the output signals of the DFB, after detection has been performed. (See "Digital Techniques for Wideband Receivers," James Tsui, Second Edition, Artech House, 2001 for a general discussion, "HF-Signal Surveillance: Signal Detection, Classification and Parameter Estimation," German Feyh, Martin Kuckenwaitz and Jurgen Reichert, Proceedings Military Communications Conference MILCOM 1994, vol.3, pp. 755–759, 1994, and "Emitter Detection and Tracking Algorithm for a Wide Band Multichannel Direction-Finding System in the HF-Band," Franz Quint, Juergen Reichert and Holger Roos, Proceedings Military Communications Conference MILCOM 1999, vol.1, pp.212–216, 1999, for particular implementations using a polyphase filter bank followed by reconstruction filters such as those reported in "Perfect Reconstruction Filter Banks with Rational Sampling Factors," Jelena Kovacevic and Martin Vetterli, IEEE Transactions on Signal Processing, Vol.41, No.6, June 1993, and the discussion provided in Background of the Invention.) These approaches lead to the software equivalent of a channelized receiver. The requirement for Nyquist filtering makes these channelized receiver forms impractical for implementation in software on a general-purpose computer, due to the large number of computations required. Unlike the prior art, the present invention recognizes that processing advantages can be realized if one considers the signal sampling requirements needed for reliable detection separately from those needed for signal extraction. In addition, the present invention exploits the LPI signal structure in the TF plane in order to arrive at a robust and practical solution. The present invention takes advantage of the fact that decimated sampling of the signals in the time-frequency representation is adequate for detection of LPI signals (and indeed longer duration signals such as single channel signals), since good detection performance can be achieved using only a few sparse samples per signal. The coarseness in time (relative to the inverse of the frequency filter bandwidth) of the filter bank is the processing advantage relative to state-of-the-art. The present invention uses the time-frequency representation only for signal detection and $1^{st}$-level parameter estimation, and provides a separate block 5 for performing signal extraction directly from the wideband input signal (rather than from the output of the DFB as done in the prior art). On the surface, going back to the wideband input signal to carry out filtering of individual detected signals would appear wasteful, since one usually wishes to exploit the filtering operations already performed by the DFB rather than performing new ones. However, the present invention recognizes that signal extraction can be performed efficiently on the wideband input signal by taking advantage of the sparseness of LPI signals in the bandwidth being analysed during any given analysis period. This translates to only performing signal extraction and subsequent processing where signals are detected. Since the ability to communicate will generally be considerably impaired when the density of signals in a given bandwidth is high (i.e. one can assume a maximum signal density in practice), this invention can be seen to provide a robust solution for signal environments that are encountered in practice.

When multiple signal channels from multiple antennas are available, the DFB 3 need not be applied completely to all channels. One form of the DFB 3 in accordance with the present invention selects a single channel and performs the digital filter bank and magnitude (or power) operations only on that channel. Another form of the DFB 3 performs the digital filter bank and magnitude operations on multiple channels, and then combines the signals either by summing the signals across the channels or by some nonlinear operation known to those skilled in the art (for example, selecting the largest signal across the channels, for each TF bin). The method of selection or combination of channels can be chosen adaptively, based, for example, on the estimated SNR in each channel.

When the SIAP is operating in signal analysis mode in accordance with the present invention, the DFB 3 will typically produce an output TF signal representation consisting of many temporal and spectral bins (the TF temporal and spectral bins are said to lie in the TF plane, by those skilled in the art). The number of spectral bins (or cells) is determined by the filter bank employed, and the number of temporal bins (also called samples or cells) depends on the input buffer size, the filter bank bin width, and the stride, m, used. Each cell in the TF plane is referred to as a TF cell or TF bin. Consider an example where the buffer size used in buffer 2 represents 100 ms of signal duration, the stride equates to 1 ms, and the filter bank produces 256 spectral samples. Then TF signal data output by the DFB 3 can then be represented as a matrix with 256 rows (covering 5 MHz of bandwidth using the previous example) and 100 columns (covering 100 ms of time). Different columns represent different temporal bins and different rows represent different spectral bins, and each TF cell (a particular row and column) contains an estimate of the signal power (or voltage) at the associated time and frequency. In the preferred embodiment for the signal analysis mode, this entire TF signal matrix is transferred as a complete block to detector 4 for processing. If the SIAP is in a jamming mode, however, the preferred embodiment has the DFB 3 filter bank output associated with each temporal stride transferred immediately to the detector 4, in order to minimize the overall system latency so that jamming is responsive. In the example illustrated above, the DFB 3 would provide a filter bank output every 1 ms to the detector 4.

In accordance with the present invention, detection and $1^{st}$-level parameter estimation is carried out in the detector 4 shown in FIG. 1. The detector 4 operates on the amplitude (or power) signals in the TF plane output from the DFB 3. The detector 4 is a key component of the present invention. It analyses/processes the TF signals at its input, first to identify the existence of particular signals such as frequency-hopping signals or single channel signals (referred to herein as detection), and second to determine the time and frequency extent of identified signals (referred to herein as end-pointing). The second step consists of coarse end-pointing in time, and frequency estimation, including bandwidth estimation if required. One preferred embodiment performs detection by first selecting appropriate thresholds using Constant False Alarm Rate (CFAR) techniques and then thresholding the time-frequency data (also called slicing). In this preferred embodiment, the thresholds are determined using Ordered Statistic CFAR techniques to produce a separate threshold for each frequency bin in the time-frequency representation (this approach is well suited for LPI signals such as frequency hoppers but may not be well suited for single channel signals), whereas an alternate approach included within the scope of this invention is to use a single threshold for all frequency bins (this approach will allow both single channel and frequency hopping signals to be simultaneously detected). In either case, the individual thresholds may be determined from the TF data itself, or using some other knowledge of the expected noise and interference levels. These particular CFAR detection techniques are known to and commonly understood by those skilled in the art. Many other state-of-the-art detection schemes are possible (in the context of the present invention) and known to those skilled in the art (e.g. cell averaging CFAR, trimmed-mean CFAR, noncoherent integration before detection, time-varying thresholds, etc.). The preferred embodiment described above is not intended to limit the form of the detector 4 that is part of this invention. The thresholded data are then processed in one or more merging/pruning stages to determine the number of signals, and the time end-points and frequency extent (and bandwidth if required) of each signal. The end-points are coarse by definition, since the time axis is decimated. Merging/pruning algorithms include second thresholds (e.g. M-out-of-N detection), as well as many other state-of-the-art alternatives known to those skilled in the art. These merging/pruning procedures make signal detection more robust by removing the effects of spurious signals, noise false alarms, and signal spillover into adjacent frequency bins. The merging/pruning parameters, e.g. M and N, are usually selected with knowledge of the nature of signals to be detected. In one form, N is related to the shortest duration signal expected, and M is related to the desired probability of detection/false alarm trade-off, or to combat signal modulation or environmental effects. In short, these merging/pruning procedures provide a noncoherent signal integration gain over noise and interference. In the general case, the net effect of the thresholding and merging/pruning operations is to perform a robust two-dimensional integration/detection in the TF plane. The output from the detector 4 is a list of detected signal indicators including the coarse end-points (start and end times), estimated center frequency, and bandwidth (if required) for each detected signal. In the preferred embodiment, centroiding of the signal energy in frequency (using, for example, interpolators known to those skilled in the art such as linear, quadratic, or cubic interpolators) is used to compute an accurate estimate of the center frequency of each detected signal. This centroided frequency is used in the signal extraction process (see description of block 5 below) to extract the detected signal from the wideband buffer 2 data. Using this approach solves the problem of not knowing the channelization (if any) employed by the transmitters in the sub-band of interest. Detected signals will be extracted correctly in block 5, with filters at their actual center frequencies, thereby increasing the effective signal-to-noise (SNR) ratio for all downstream processing such as that performed in block 6 of FIG. 1.

The above description of the detector 4 is the preferred form for the signal analysis mode of operation. A few differences should be noted, however, if the SIAP is operating in a jamming mode. In this case, the preferred embodiment has detector 4 operating on a TF signal matrix containing (in the limiting preferred case) just a single stride of data (i.e. representing one temporal bin) at a time. In this way, the detection list (as a result of detection and endpointing operations) can be reported by the detector 4 to block 5 and/or block 6 (in FIG. 1) every stride, and with a latency corresponding to the stride (i.e. using the numbers in the previous example, every 1 ms). As a result, jamming will be responsive. In this embodiment, detection becomes a one-dimensional operation (i.e. across frequency bins, for the given temporal bin) and merging/pruning in the temporal dimension is not needed. (In the case where more than one stride of data is contained in the TF signal matrix, the general form of detection and merging/pruning described in the preferred embodiment for the signal analysis mode apply). In another embodiment, integration in the time domain is applied by retaining data from a small number (N) of past strides in a FIFO buffer, and then detection is performed as per the aforementioned signal analysis mode embodiment. In this case, the latency is increased to be N times the stride length; the advantage of the approach is in more robust detection.

The signal extractor (Block 5 in FIG. 1) is another key element of this invention; it extracts a sequence of baseband samples for each detected signal. It uses the detected signal indicators (coarse end-points, center frequency, bandwidth) to appropriately filter the corresponding sub-sequences of the buffered samples taken from buffer 2, in contrast to the relevant prior art (as described earlier), where the samples used in the signal extraction process are taken from the output of the DFB 3. The time extent of the input samples to filter (i.e. extract) for each signal is determined by the coarse end-points, conservatively extended to delineate the entire signal temporally. The filter center frequency is given by the estimated center frequency in the signal indicator reported by detector 4. The filter bandwidth is set by the estimated bandwidth if provided in the signal indicator, or by a pre-defined bandwidth if assumed a-priori. The extraction filter operates on the wideband signal data in buffer 2 in order to maximize fidelity out of the extraction process, while simultaneously decimating the output signal sampling rate, generally set to be commensurate with the actual signal bandwidth. The approach used in accordance with the present invention is similar to the decimation scheme utilized in the TF filtering operation performed in the DFB 3, where the temporal stride of the extraction filtering operation used here is set in accordance with the signal bandwidth. The extraction filter can take any one of a number of forms known to those skilled in the art, although the preferred embodiment uses a finite impulse response (FIR) filter represented in time at the same sampling rate used with the signal samples in buffer 2. It is the stride of the FIR filter (i.e. the temporal shift between convolution operations) that provides the temporal decimation desired, thereby significantly reducing the number of computations without sacrificing any output signal fidelity. The decimation factor can be any value equal to or greater than 1.0 but the preferred embodiment uses a factor such that the extracted signal is sampled at a rate consistent with its bandwidth. Using the previous example, where the buffer 2 signals are sampled at 5 MHz, and assuming that the signal bandwidth is 25 kHz and that a 50 kHz signal sampling rate is desired, a decimation factor 100 can be used effectively, reducing the numerical computations otherwise required by the extraction filtering operation. For frequency-agile transmissions such as frequency hoppers, the extracted samples for one detected signal represent the complex base-band samples corresponding to an individual hop from the sequence of transmitted signal hops.

In the case where the SIAP is operating in a jamming mode, the signal extractor 5 can be effectively bypassed, and the signal indicators reported from the detector 4 can be passed on directly to block 6.

Having coarse hop end-points means that hop signals are only extracted where they exist; most of the "open" time-frequency space is not processed, further reducing the computation requirements. The sparseness in the extraction process is one of the keys to the efficiency of the present invention, as compared to state-of-the-art. If hops happen to be more dense than usual (or expected) at a particular moment, throttling concepts (where only the most important hops are extracted, or only the most important parameters are estimated) can maintain real-time performance. Alternatively, buffering at various stages in the SIAP can be used effectively to allow the SIAP to "catch up" with real-time during periods where the hop density is sparser than usual (or expected). It should be noted that such buffering schemes can be collectively handled by the buffer 2.

Another advantage of the present invention is in having hop end-points in frequency (or just a center frequency estimate) available before signal extraction. These frequency estimates are obtained by centroiding the energy merged into a particular detection. Having a pre-estimate of the frequency of each signal allows for better extraction performance than can be achieved with a full-rate filter bank such as those employed in the prior art. This improvement occurs because in the present invention, a single extraction filter is used to extract the signal. With the prior art approaches, the extraction of signals straddling filters requires complex interpolation between the signals in adjacent filters; this process suffers performance degradations if the signal channelization is incorrectly assumed. With the present invention, no such signal channelization assumptions are necessary.

Finally, the samples for the extracted signals are buffered and/or processed further in the post-processor (i.e. block 6 in FIG. 1). Specifically, the post-processor 6 can include $2^{nd}$-level estimation algorithms that process the extracted signals to produce accurate estimates of signal parameters such as: more precise start and end times, more precise center frequency and bandwidth, rise time and fall times, received power, signal modulation, modulation parameters such as baud rate, direction of arrival, signal duration, hop rate, etc. These parameters by themselves provide valuable information about the signals in the analysis bandwidth, and for frequency-hopping signals they can be used further to link or chain extracted hops (i.e. deinterleaving). Hops that have common and consistent characteristics are linked together, and the chains are identified as sequences of hops from different transmitters or radios. The estimated parameters can also be used to further demodulate the extracted signals and produce the underlying data stream. Signal exploitation techniques can be applied to determine the underlying messages. In the case where the SIAP is operating in a jamming mode, the post-processor 6 can use signal indicators reported by the detector 4 to initiate jamming.

The computational advantage afforded by the present invention in comparison to the prior art for real world practical applications is very significant, especially when one considers the combined computational saving afforded by the unique designs of the DFB 3 and the signal extractor 5. The net result is that challenging practical applications for wideband, digital, intercept receiver systems can now be addressed by flexible, low-cost, programmable solutions implemented in software on general-purpose computers, today. This conclusion is far more than just a claim, as a multi-channel version of the invention has been built, tested and demonstrated to run in real-time with real VHF signal environments using an off-the-shelf, dual Pentium III personal computer and C++ programming of the entire SIAP (see "A Fast Software Implementation of a Digital Filter Bank Processor for Analyzing Frequency Hopping Signals," Al Premji, Tim J. Nohara, Robert Inkol and William Read, presented at the TTCP Digital Receiver Technology Workshop, Ottawa, Canada, Sep. 10–12, 2001).

Although the invention has been described in terms of particular embodiments and applications, one of ordinary skill in the art, in light of this teaching, can generate additional embodiments and modifications without departing from the spirit of or exceeding the scope of the claimed invention. It is to be noted, for instance, that certain features of the present invention are useful even given full or non-decimated sampling in the time domain. Non-decimated sampling is possible where the signal intercept and analysis processor is implemented by a high speed computer with a large memory capacity. Accordingly, the drawings and descriptions herein are proffered to facilitate comprehension of the invention and not to limit or circumscribe the scope thereof.

What is claimed is:

1. A signal intercept and analysis processor for a wideband intercept receiver system including at least one wideband receiver, said intercept and analysis processor comprising:
   a signal detector operatively connectable to said wideband receiver, wherein said detector is configured for automatically detecting the existence of multiple signals simultaneously present in said wideband receiver and estimating respective time and frequency extents of the detected signals; and
   a signal extractor operatively connected to said signal detector and connectable to said wideband receiver for performing signal extraction directly on a wideband signal output of said receiver and for performing said signal extraction on one or more of the detected signals using the respective time and frequency extents.

2. The signal intercept and analysis processor defined in claim 1, further comprising a buffer connectable to said receiver on one side and connected to said detector and said extractor on another side.

3. A signal intercept and analysis processor for a wideband intercept receiver system including at least one wideband receiver, said intercept and analysis processor comprising:
   a signal detector operatively connectable to said wideband receiver, wherein said signal detector includes means for generating a time-frequency representation of a wideband signal output of said receiver;
   a signal extractor operatively connected to said signal detector and connectable to said wideband receiver for performing signal extraction directly on said wideband signal output of said receiver and for performing said signal extraction only upon detection of at least one signal by said signal detector.

4. The signal intercept and analysis processor defined in claim 3 wherein said means for generating is a means for generating a coarsely sampled or decimated time-frequency representation of said wideband signal output.

5. The signal intercept and analysis processor defined in claim 4 wherein said time-frequency representation is decimated or coarsely sampled in time compared to an inverse frequency filter bandwidth used in said time-frequency representation.

6. The signal intercept and analysis processor defined in claim 3 wherein said means for generating includes a digital filter bank.

7. The signal intercept and analysis processor defined in claim 6 wherein said digital filter bank includes means for performing a sequence of windowed FFTs on samples of said wideband signal output.

8. The signal intercept and analysis processor defined in claim 7 wherein a stride between consecutive ones of said FFTs is considerably larger than a length of each of said FFTs.

9. The signal intercept and analysis processor defined in claim 3, further comprising a buffer connectable to said receiver on one side and connected to said detector and said extractor on another side.

10. A signal intercept method for a wideband intercept receiver system, said method comprising:
    analyzing a wideband signal output of a wideband receiver to detect the existence of a plurality of signals simultaneously present in said wideband signal output and to estimate respective time and frequency extents of the detected signals; and
    upon detecting the presence of multiple signals simultaneously present in said wideband signal output, extracting at least one of the multiple signals directly from said wideband signal output using the respective estimated time and frequency extents.

11. The signal intercept method defined in claim 10, further comprising temporarily storing said wideband signal output in a buffer prior to the analyzing of said wideband signal output.

12. The signal intercept method defined in claim 11 where the storing of said wideband signal continues at least until the extracting of said at least one of the multiple signals occurs, the same stored data being used in the analyzing of said wideband signal output and the extracting of said at least one of the multiple signals.

13. The signal intercept method defined in claim 10, further comprising extracting all of the detected signals directly from said wideband signal output upon detecting said signals in said wideband signal output, the extracting of the detected signals including using the respective estimated time and frequency extents.

14. A signal intercept method for a wideband intercept receiver system, said method comprising:
    analyzing a wideband signal output of a wideband receiver to detect whether a signal is present in said wideband signal output, wherein the analyzing of said wideband signal output includes generating a time-frequency representation of said wideband signal output; and
    upon detecting the presence of at least one signal in said wideband signal output and only upon detecting the presence of at least one signal in said wideband signal output, extracting said signal directly from said wideband signal output.

15. The signal intercept method defined in claim 14 wherein said time-frequency representation is coarsely sampled or decimated.

16. The signal intercept method defined in claim 15 wherein said time-frequency representation is decimated or coarsely sampled in time compared to an inverse frequency filter bandwidth used in said time-frequency representation.

17. The signal intercept and analysis method defined in claim 14 wherein the generating of said representation includes operating a digital filter bank.

18. The signal intercept method defined in claim 17 wherein the operating of said digital filter bank includes performing a sequence of windowed FFTs on samples of said wideband signal output.

19. The signal intercept method defined in claim 14 wherein a stride between consecutive ones of said FFTs is considerably larger than a length of each of said FFTs.

20. The signal intercept method defined in claim 14, further comprising temporarily storing said wideband signal output in a buffer prior to the analyzing of said wideband signal output.

21. The signal intercept method defined in claim 14 wherein said one signal is one of a plurality of signals present in said wideband signal output, the analyzing of said wideband signal output including the detecting of all said signals in said wideband signal output, further comprising, extracting said signals directly from said wideband signal output upon detecting the presence of said signals in said wideband signal output.

22. A signal intercept and analysis processor for a wideband intercept receiver system, said intercept and analysis processor comprising:
 a digital filter bank generating a coarsely sampled or decimated time-frequency representation of a wideband signal output of a wideband receiver of said wideband intercept receiver system, said time-frequency representation being coarsely sampled or decimated in a time domain and fully represented in a frequency domain; and
 a signal detection component operatively connected to said digital filter bank for analyzing said time-frequency representation to detect presence of at least one unknown signal.

23. The signal intercept and analysis processor defined in claim 22 wherein said digital filter bank includes means for performing a sequence of windowed FFTs on samples of said wideband signal output.

24. The signal intercept and analysis processor defined in claim 23 wherein a stride between consecutive ones of said FFTs is considerably larger than a length of each of said FFTs.

25. The signal intercept and analysis processor defined in claim 22 wherein said time-frequency representation is decimated or coarsely sampled in time compared to an inverse frequency filter bandwidth used in said time-frequency representation.

26. A signal intercept and analysis method comprising:
 generating a coarsely sampled or decimated time-frequency representation of a wideband signal output, said time-frequency representation being coarsely sampled or decimated in a time domain and fully represented in a frequency domain; and
 analyzing said time-frequency representation to detect presence of at least one unknown signal.

27. The signal intercept and analysis method defined in claim 26, further comprising estimating and outputting coarse end points and a center frequency for each detected signal.

28. The signal intercept and analysis method defined in claim 27 wherein the estimating of a center frequency includes centroiding signal energy in frequency for a respective detected signal.

29. The signal intercept and analysis method defined in claim 28 wherein estimating and outputting of said center frequency includes estimating and outputting signal bandwidth.

30. The signal intercept and analysis method defined in claim 29, further comprising using said estimated center frequency as a filter center frequency to extract the detected signal directly from said wideband signal output, using said coarse end points to determine an extent of samples of said wideband signal output, and using said signal bandwidth to select a digital filter for extracting the detected signal.

31. The signal intercept and analysis method defined in claim 27, further comprising using said coarse end points to determine an extent of samples of said wideband signal output and using said estimated center frequency as a filter center frequency to extract the detected signal directly from said wideband signal output.

32. The signal intercept and analysis method defined in claim 26 wherein the generating of said time-frequency representation includes operating a coarse digital filter bank.

33. The signal intercept and analysis method defined in claim 32 wherein the operating of said coarse digital filter bank includes performing a sequence of windowed FFTs on samples of said wideband signal output.

34. The signal intercept and analysis method defined in claim 30 wherein a temporal stride between consecutive one of said FFTs is considerably larger than a length of each of said FFTs.

35. The signal intercept and analysis method defined in claim 33 wherein consecutive FFTs are separated by a temporal stride, the analyzing of said time-frequency representation being performed after each temporal stride.

36. The signal intercept and analysis method defined in claim 26, further comprising temporarily storing the wideband signal output prior to the generating of said time-frequency representation.

37. The signal intercept and analysis method defined in claim 26 wherein said time-frequency representation includes only power or magnitude as a function of time and frequency.

38. The signal intercept and analysis method defined in claim 26, further comprising extracting the detected signal directly from said wideband signal output.

39. The signal intercept and analysis method defined in claim 38, further comprising estimating a bandwidth of the detected signal, the extracting of said detected signal being at a sampling rate reduced or decimated in accordance with the estimated bandwidth.

40. The signal intercept and analysis method defined in claim 38, further comprising estimating a bandwidth and center frequency of the detected signal and using a filter corresponding to the estimated bandwidth and center frequency to extract the detected signal.

41. The signal intercept and analysis method defined in claim 26 wherein the analyzing of said time-frequency representation includes first selecting thresholds using Constant False Alarm Rate techniques and then thresholding time-frequency data.

42. The signal intercept and analysis method defined in claim 41, further comprising operating on at least one of time and frequency dimensions to generate an enhanced level of detection, the operating being taken from the group consisting of merging and pruning of the thresholded time-frequency data.

* * * * *